(12) United States Patent
Vogt et al.

(10) Patent No.: US 7,802,842 B2
(45) Date of Patent: Sep. 28, 2010

(54) ROOF MODULE OF A MOTOR VEHICLE

(75) Inventors: Oliver Vogt, Munich (DE); Bernhard Schleicher, Munich (DE); Thomas Rudolph, Windach (DE); Michael Koelbl, Neurled (DE); Anton Jöhl, Bad Heilbrunn (DE); Alain Leroy, Riederau (DE); Rupert Kogler, Starnberg (DE); Nigel Westwood, Wettstetten (DE); Mirko Konta, Gaimersheim (DE)

(73) Assignee: Webasto AG, Stockdorf (DE)

( * ) Notice: Subject to any disclaimer, the term of this patent is extended or adjusted under 35 U.S.C. 154(b) by 202 days.

(21) Appl. No.: 11/913,214

(22) PCT Filed: May 24, 2006

(86) PCT No.: PCT/DE2006/000903
§ 371 (c)(1), (2), (4) Date: Oct. 31, 2007

(87) PCT Pub. No.: WO2006/125429
PCT Pub. Date: Nov. 30, 2006

(65) Prior Publication Data
US 2008/0185876 A1    Aug. 7, 2008

(30) Foreign Application Priority Data
May 24, 2005    (DE) .................... 10 2005 024 464

(51) Int. Cl.
*B62D 25/06* (2006.01)
(52) U.S. Cl. .................... 296/210; 296/37.7; 224/309; 224/317
(58) Field of Classification Search .............. 296/210, 296/37.7; 224/309, 317
See application file for complete search history.

(56) References Cited

U.S. PATENT DOCUMENTS

| | | | | |
|---|---|---|---|---|
| 4,363,513 A | * | 12/1982 | Sahar | 296/140 |
| 4,671,565 A | * | 6/1987 | Grimm et al. | 296/216.04 |
| 5,546,722 A | * | 8/1996 | Huang | 52/646 |
| 5,725,273 A | * | 3/1998 | Vernon et al. | 296/218 |
| 6,761,296 B2 | * | 7/2004 | Ford et al. | 224/310 |
| 2003/0159264 A1 | | 8/2003 | McLeod et al. | |
| 2003/0162490 A1 | * | 8/2003 | Klesing et al. | 454/137 |

(Continued)

FOREIGN PATENT DOCUMENTS

DE    3429880    2/1986

(Continued)

*Primary Examiner*—Patricia L Engle
*Assistant Examiner*—SunSurraye Westbrook
(74) *Attorney, Agent, or Firm*—Fitch, Even, Tabin & Flannery; John M. Naber

(57) ABSTRACT

The invention relates to a roof module of a motor vehicle, which can be fastened to the chassis of the motor vehicle and defines a roof area. The aim of the invention is to improve the utility of the roof module or the motor vehicle. For this purpose, the roof module (9) is a planar full roof that is non-transparent or at least partially transparent, or the roof module (9) is a panoramic roof that projects towards the top and/or is at least partially transparent and/or comprises a roof box fixed to the top thereof, or comprises a bearing device (18) for detachably fixing a roof box (19) to the top of the roof module (9).

9 Claims, 7 Drawing Sheets

U.S. PATENT DOCUMENTS

| | | | |
|---|---|---|---|
| 2005/0116510 A1* | 6/2005 | Leroy et al. | 296/216.01 |
| 2005/0116511 A1* | 6/2005 | Leroy et al. | 296/216.01 |
| 2009/0001767 A1* | 1/2009 | Yamaguchi et al. | 296/203.04 |

FOREIGN PATENT DOCUMENTS

| | | |
|---|---|---|
| DE | 9207442 | 10/1992 |
| DE | 10056041 | 5/2002 |
| DE | 10210615 | 10/2003 |
| DE | 10340746 | 3/2005 |
| EP | 0563526 | 10/1993 |
| EP | 1400411 | 3/2004 |
| WO | WO 2004024538 | 3/2004 |

\* cited by examiner

ROOF MODULE OF A MOTOR VEHICLE

The invention relates to roof module of a motor vehicle which can be attached to the body of the motor vehicle and forms a roof area, and to a motor vehicle having such a rood module.

This application is a 35 U.S.C. §371 National Stage entry of PCT/DE2006/000903, filed May 24, 2006, which claims priority from German Patent Application No.: DE 10 2005 024 464.5, filed on May 24, 2005, the contents of which are herein incorporated by reference.

Such roof modules are essentially known in various embodiments. For example, DE 102 30 443 A1 describes a motor vehicle having a roof module which can be mounted on and attached to a vehicle body and has a windshield and a roof area connected thereto, the roof area being made of a transparent material in at least some areas.

DE 100 56 041 A1 discloses a cover for the roof of a motor vehicle, arranged on and attached to the roof and having a container extending over the width of the roof. The container is subdivided into two lateral cassettes in its longitudinal direction by a receiving channel arranged in the center, these cassettes being interconnected on both sides of the receiving channel, thus forming an essentially U-shaped cross section geometry of the container. A ski box designed as a portable module is insertable into and attachable to the receiving channel along its length, the ski box being adapted to the shape of the receiving channel.

DE 197 29 044 A1 describes a modular kit for a motor vehicle comprising multiple components optionally to be mounted on the motor vehicle to alter the use options and/or appearance of a motor vehicle. The components are designed as a roof cover to be inserted into a roof opening of the motor vehicle.

The object of the invention is to provide a roof module as defined in the introduction in different embodiments, each roof module optionally being mounted on a motor vehicle to increase the utilitarian benefit thereof. Another object is to provide a motor vehicle for accommodating such an improved roof module.

This object is achieved according to this invention with the roof module defined in the introduction by the fact that the roof module is a flat full roof that is not transparent or is at least partially transparent. This roof module constitutes an inexpensive approach due to the simple manufacturing method and complies with average requirements. Another approach is for the roof module to be a panorama roof that is elevated upwardly and/or is at least partially transparent and/or has a roof box fixedly mounted on its surface or has a supporting device for detachable attachment of a roof box to the top side of the roof module. These individual or combined embodiments of the roof module offer the user a higher utilitarian value when the module is mounted on his vehicle.

The second object mentioned above is achieved by a motor vehicle having a body structure for fixed or detachable mounting of a roof module that closes a vehicle body opening, whereby the roof module mountable on the vehicle body structure is formed according to one of claims 1 through 10. The user of the motor vehicle may thus benefit from the advantages of the roof module selected.

It is especially advantageous when the roof module mountable on the vehicle body structure is selectable from a group of at least two roof modules, each being formed according to one of claims 1 through 10. The user can select the roof module that meets his/her needs from among the roof modules which are offered in a variety of configurations and may, if applicable, replace it with another roof module.

Advantageous embodiments of the invention are characterized in the subclaims.

The roof module may also expediently include the windshield of the vehicle. The windshield then forms a unit together with the roof area of the roof module.

In a preferred embodiment, the roof module has a nontransparent Y-shaped structure and the free ends of the two Y legs are ending at the A pillars on the front side of the roof or at the lateral roof side members of the roof, especially particular in the area of the A pillars. This Y structure forms a visual division of the roof surface and may define areas below which function components are arranged beneath the roof surface or roof skin and are thus visually concealed from the top side.

The roof box may be arranged centrally on the roof module in the longitudinal extent. It is thus expedient for the central longitudinal base of the Y structure to have a receptacle for the roof box. The receptacle is thus visually integrated into the Y structure.

A special advantage is obtained when the roof module comprises a reinforcing structure. This reinforcing structure increases the torsional strength of the roof, for example, in a defined manner so that the roof and the vehicle can be constructed more easily in its entirety.

It is especially expedient when the Y structure is formed as a reinforcing structure. Then the visual advantage can be combined with the increased strength of the roof. In addition, the Y structure as a reinforcing structure offers the option of mounting additional components on the top side of the roof module as well as on its bottom side. There are various possible arrangements of the reinforcing structure, but it is expedient if the Y structure and/or the reinforcing structure is/are provided beneath the roof skin of the roof module so that the top side may be formed with a smooth surface.

The Y structure and/or the reinforcing structure may be formed as a frame arrangement and frame openings formed by the frame arrangement may be closed by the roof skin and/or the windshield which are placed on or inserted into the frame arrangement.

The Y structure is not limited to a shape corresponding to the ideal shape of the letter but instead may be selected freely for the most part. For example, the two Y legs may also be curved and a second Y structure may also be provided at the rear opposite the front Y structure.

The roof module may be made of glass, plastic, in particular transparent plastic such as polycarbonate, or at least partially from laminated and pressed materials.

The invention is explained in greater detail below on the basis of exemplary embodiments of the roof module with reference to the drawings, in which FIG. 1 is a perspective view of a motor vehicle having a roof module which forms a nontransparent roof surface;

Figure 1:
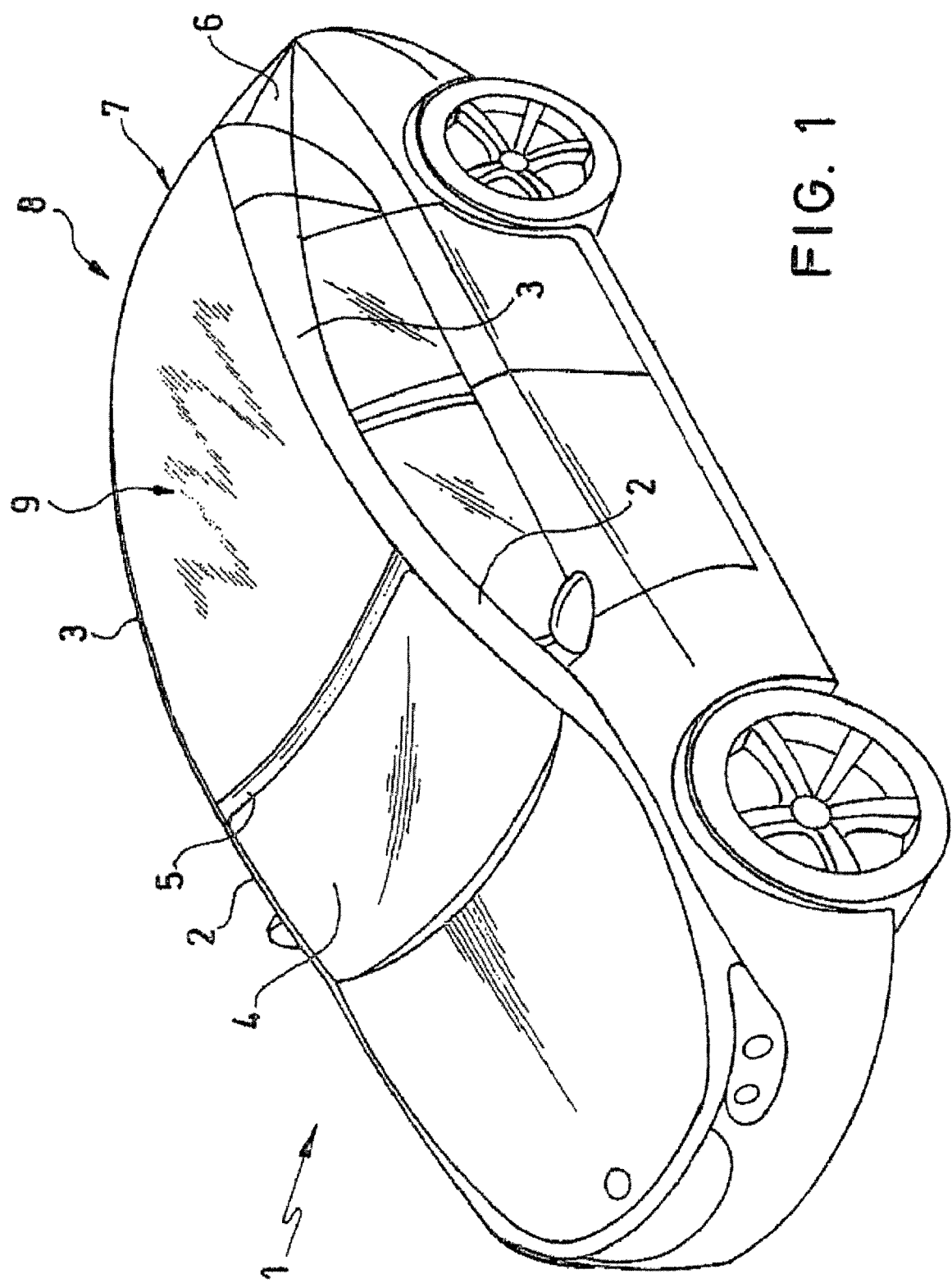

A motor vehicle 1 (see FIG. 1), e.g., a four-door fastback or notchback limousine, comprises a vehicle body having A pillars 2 which develop into lateral roof side members 3. A windshield 4 is bordered at its upper edge by a window frame or cowl 5. Each roof side member 3 ends at a vehicle body structure which is designed in the manner of a C pillar or D pillar 6, for example, at the rear end. A rear roof cross-member 7 connects the rear ends of the two roof side members 3. A roof 8 of the motor vehicle 1 includes a roof module 9 that closes a roof opening bordered by the lateral roof side members 3, the cowl 5 and the rear roof cross-member 7. The roof module 9 comprises or forms a roof skin of a full roof that is manufactured in a nontransparent construction style, e.g., made of steel or plastic. A roof liner and equipment parts such as handles or lights (not shown) may be provided on the underside of the roof skin and/or the roof module 9 facing the interior of the vehicle.

The roof module 9 is detachably or permanently mounted on the respective receptacle surfaces or flanges on the vehicle body structure and/or on the roof side members 3, the cowl 5 and the rear roof cross-member 7. Thus a vehicle roof configured to conform to customer's wishes can be produced by attaching the selected roof module 9 during the manufacture of the motor vehicle, the roof module 9 preferably being selectable from a group of several different roof modules having the same mounting dimensions. Additional exemplary embodiments of suitable roof modules are explained below. If the roof module is detachably mounted on the vehicle body structure, it may, if needed to comply with user's wishes, be replaced by another roof module having different properties on request by the user.

The roof module 9 depicted in FIG. 1 may also have a transparent roof skin made of glass or polycarbonate or some other transparent material, for example, and providing a roof that is known as a panorama roof. Such a panorama roof which offers unhindered vision upward may also have an elevated shape due to an upwardly directed curvature in the roof skin, thus forming a cupola-like feeling of space in the interior of the vehicle.

Figure 2:
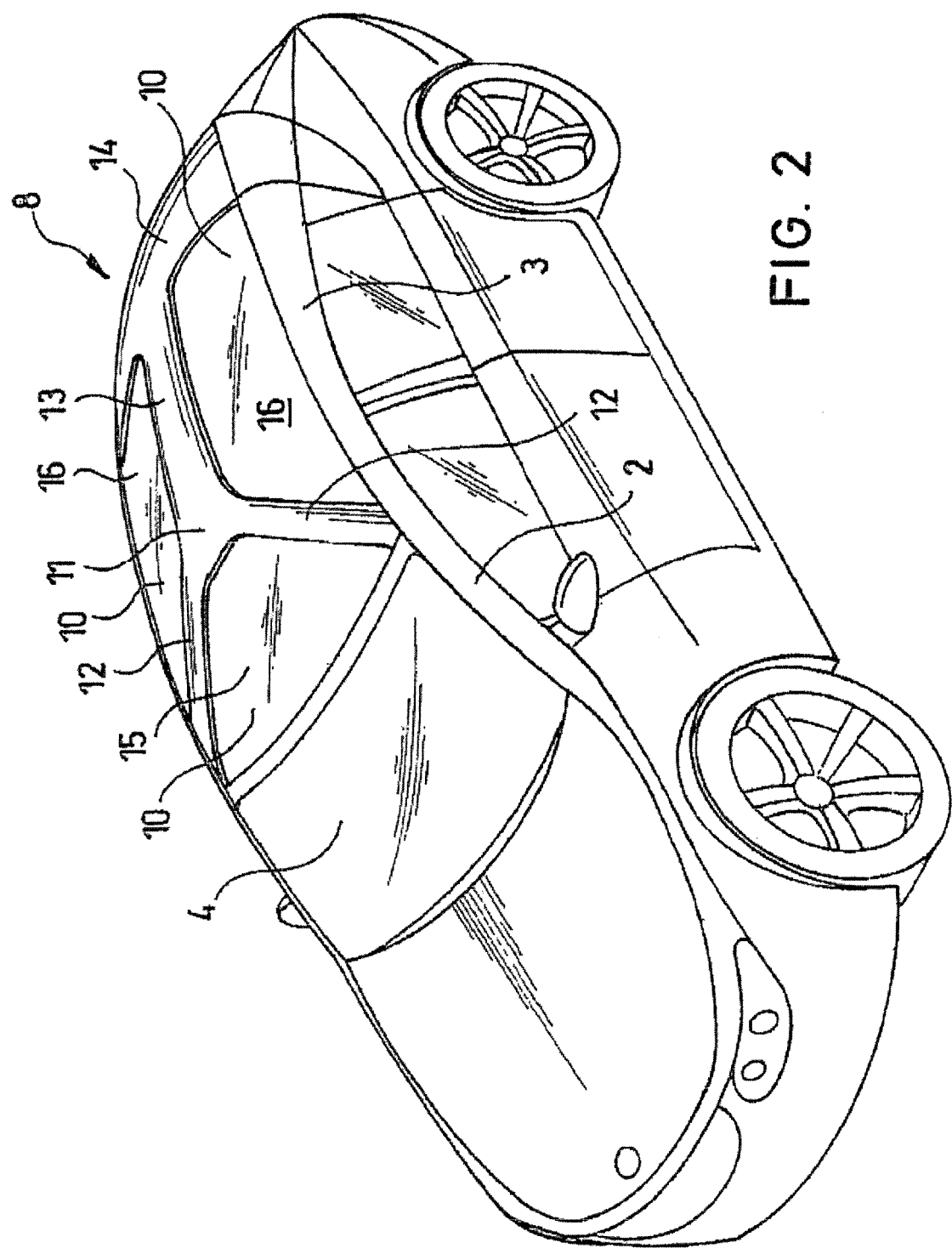
FIG. 2 is a perspective view of a motor vehicle having another roof module that has transparent and nontransparent areas.

The vehicle roof 8 depicted in FIG. 2 comprises a roof module 9 with transparent areas 10 and nontransparent areas 11 in the roof skin. The nontransparent areas essentially form a Y-shaped structure, whereby the free ends of the two Y legs 12 end at the A pillars 2 on the front side of the roof and in particular end in the area of the A pillars 2 at the lateral roof side members 3, and the central longitudinal base 13 of the Y structure develops at the rear end into a transverse strip 14, which extends over the width of the roof skin on its rear end. This creates, for example, an approximately trapezoidal or triangular front viewing area 15 of the roof module 9 plus two laterally arranged viewing areas 16. With curved Y legs 12, the front viewing area 15 may also be approximately semicircular. However, the shape of the Y legs 12 may be varied, so that a suitably shaped front viewing area 15 is provided, which in any case improves the view of the driver and/or passenger upward.

The nontransparent areas 11 are formed by pigmentation or enameling of a roof skin, e.g., made of glass or a transparent plastic, or by some other covers.

Figure 6:
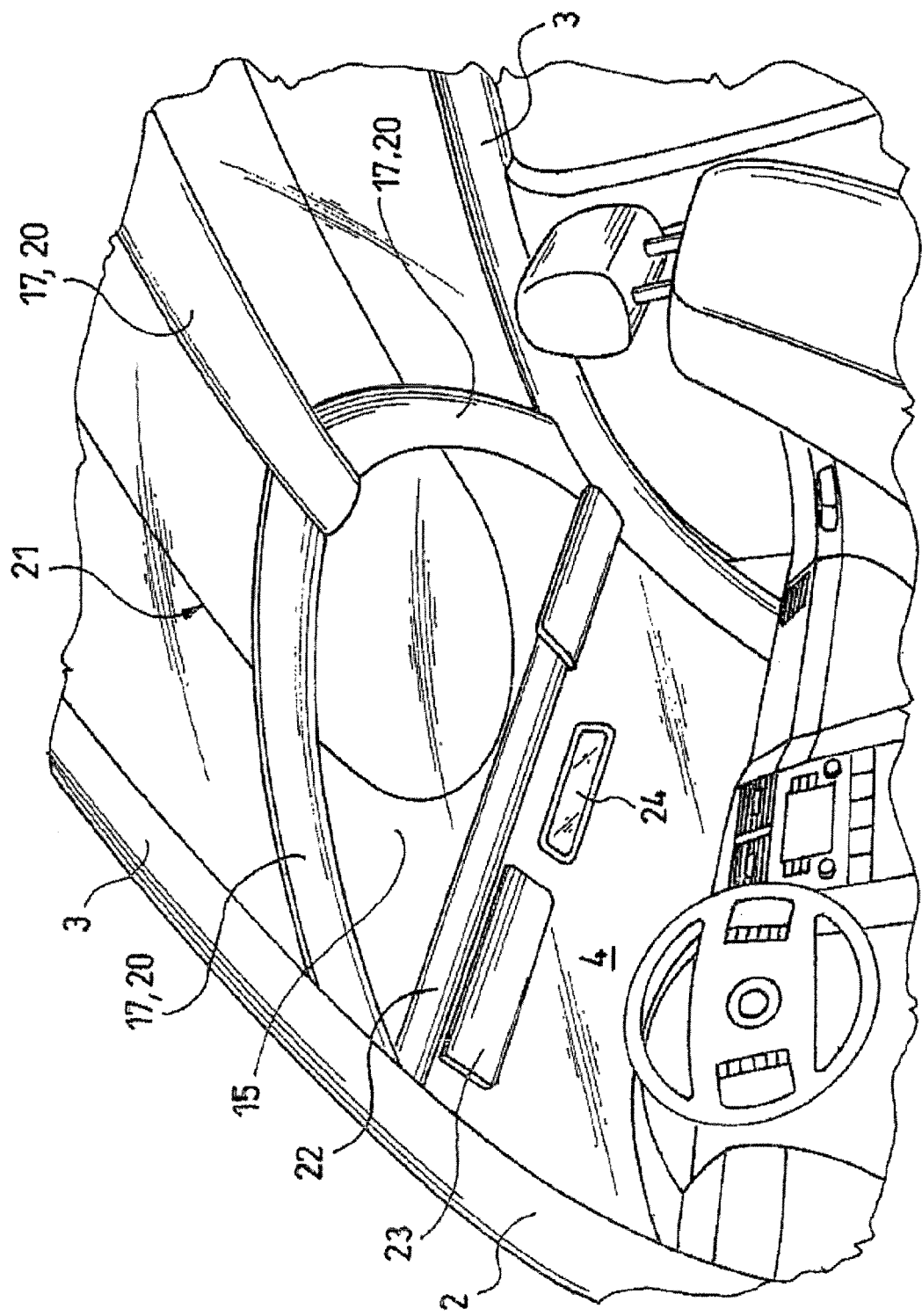
FIG. 6 is a perspective inside view of a front section of a roof module having an integrated windshield and FIG. 7 is a perspective view from above of a roof module with a roof box which is movably mounted on the roof module by means of a supporting device and is arranged in a downwardly pivoted rear loading position.

The nontransparent areas 11 may also be formed by a frame arrangement of the roof module 9, in particular one that has a reinforcing effect. Such a frame arrangement may be integrally formed by thickening of the material or by incorporation of foreign materials. Furthermore, an independent frame arrangement 17 may be provided, arranged on the bottom side of the continuous roof skin (see FIG. 6, for example) or inserted into or mounted on the transparent parts of the roof skin to form a continuous roof.

Figure 3:
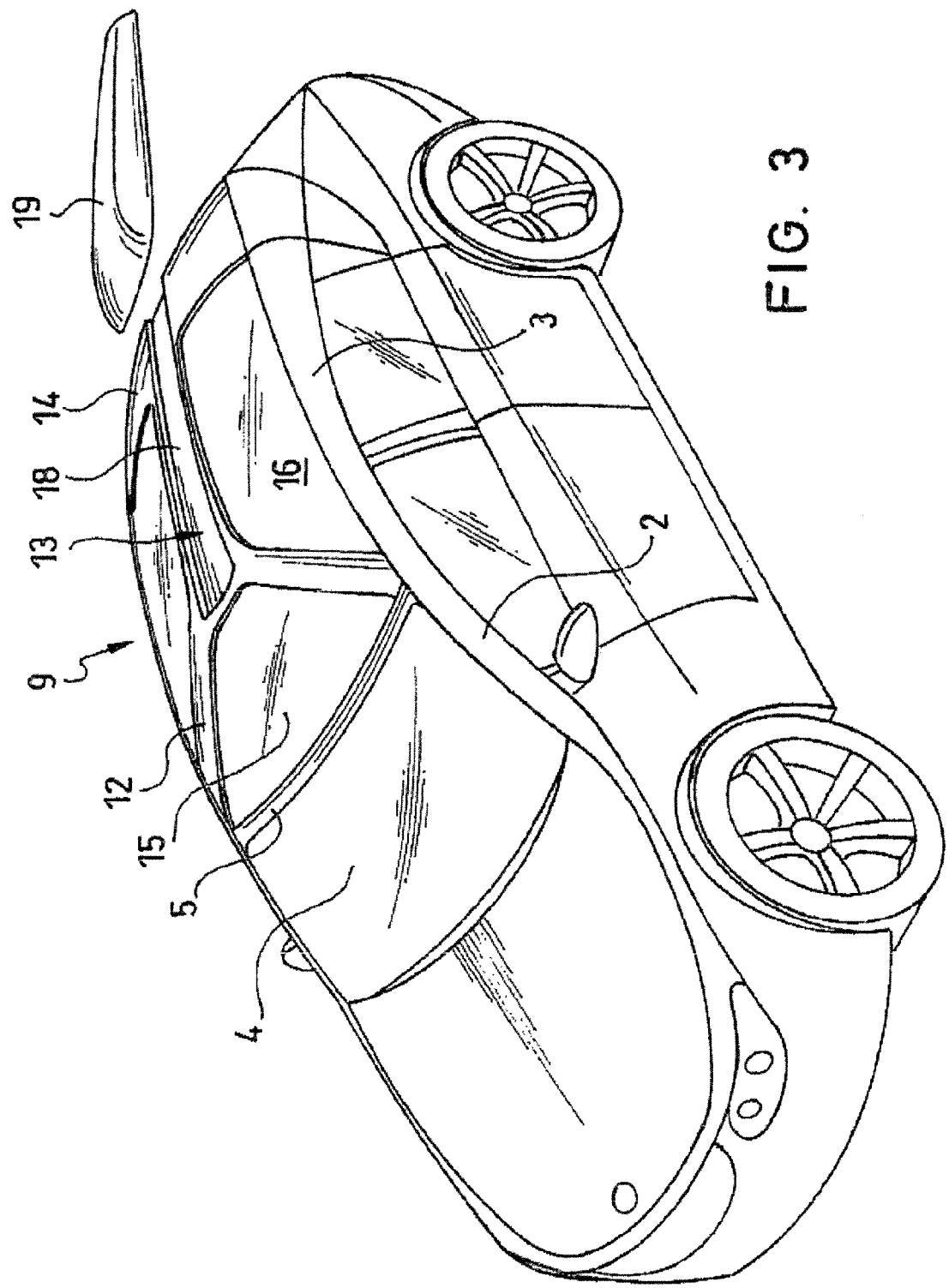
FIG. 3 is a perspective view of a motor vehicle having a roof module with a mounting device on its top side for mounting a roof box.

FIG. 3 shows a modification of the roof module 9 depicted in FIG. 2, whereby a longitudinally directed receptacle 18 for a roof box 19 is formed on the central longitudinal base 13 of the Y structure. The receptacle 18 is a recessed channel, for example, which extends to the rear edge of the roof and into which the roof box 19 can be inserted forward from the rear. The roof box 19 which provides additional useful space is surrounded on its bottom side by the receptacle 18 in the form of a dovetailed arrangement and held displaceably, to be attached detachably to the roof module 9 by fastening means (not shown). The roof box 19 is adapted in shape and color to the roof module 9 and/or the Y structure 12, 13.

Figure 4:
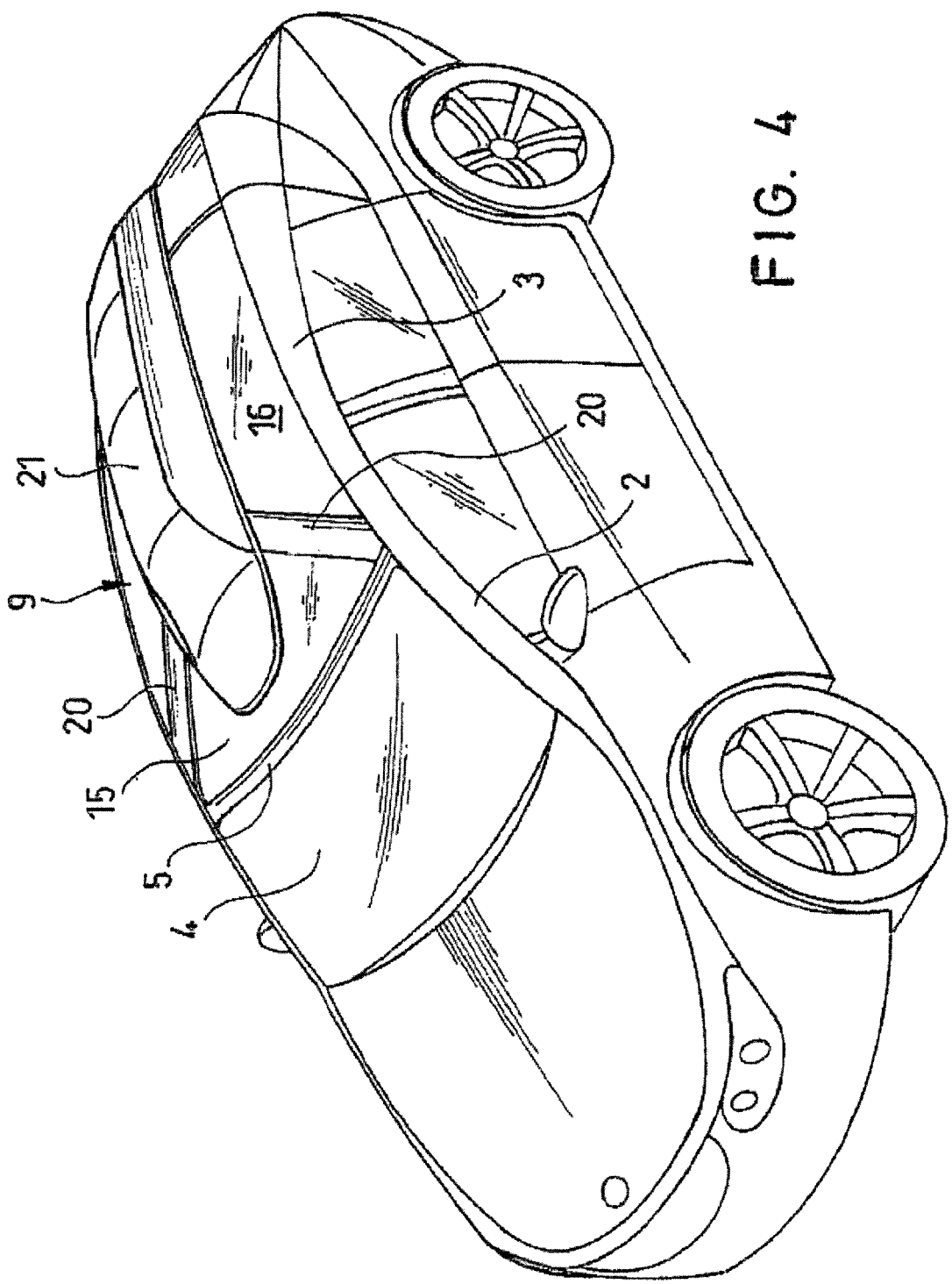
FIG. 4 is a perspective view of a motor vehicle with another exemplary embodiment of a roof module having a fixed mounted roof box on its top side.

The roof module 9 shown in FIG. 4 has a carrier frame 20 in the Y structure described here on which a roof box 21 is fixedly mounted. Due to the stable design of the carrier frame 20, it provides a secure mounting of the roof box 21 and imparts a high torsional rigidity to the roof so that, for example, the cowl 5 must assume a lesser carrying function and may therefore be designed with a reduced cross section. The view forward is improved by the reduced cross section of the cowl 5.

Figure 5:
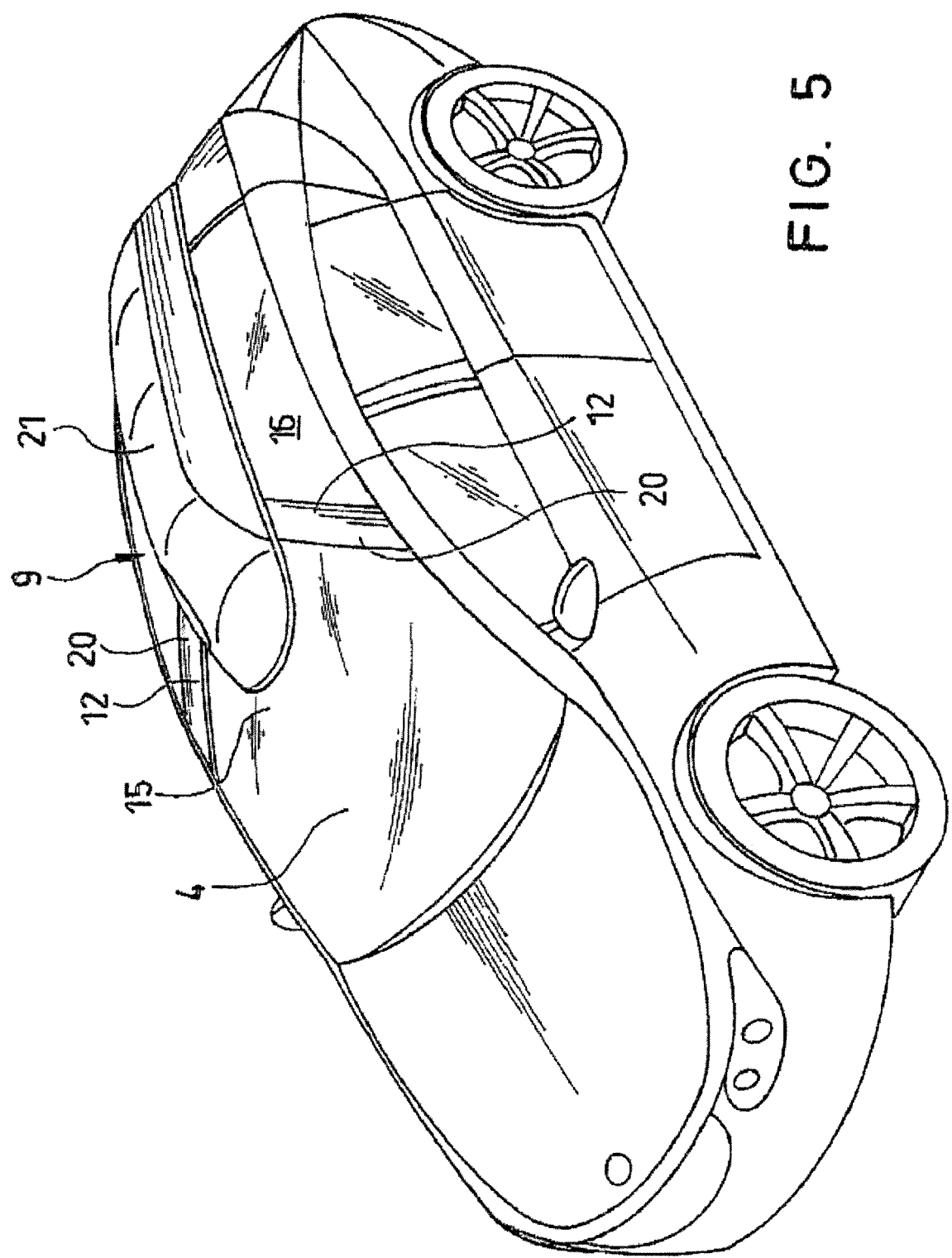
FIG. 5 is a perspective view of a motor vehicle having a roof module that includes an integrated windshield.

The roof module 9 shown in FIG. 5 also comprises a carrier frame 20 in a Y structure according to the preceding exemplary embodiment to which a roof box 21 is attached. In addition, the windshield 4, which is integrated into the roof module 9, develops without interruption into the roof skin of the forward viewing area 15 in the upward direction, said windshield extending up to the two Y legs 12 of the carrier frame 20. This eliminates the cowl 5 and improves the viewing conditions. Instead of the cowl 5, a transverse strut 22 or transverse strip may extend over the inside of the windshield 4 and/or the roof skin of the front viewing area 15 (see FIG. 6) which is attached laterally to the roof side members 3 and/or the A pillars 2, for example, or is adhesively bonded to the inside of the windshield 4 and/or the roof skin. The transverse struts 22 or transverse strips may support equipment parts such as sun visors 23 or a rear view mirror 24, for example.

Figure 7:
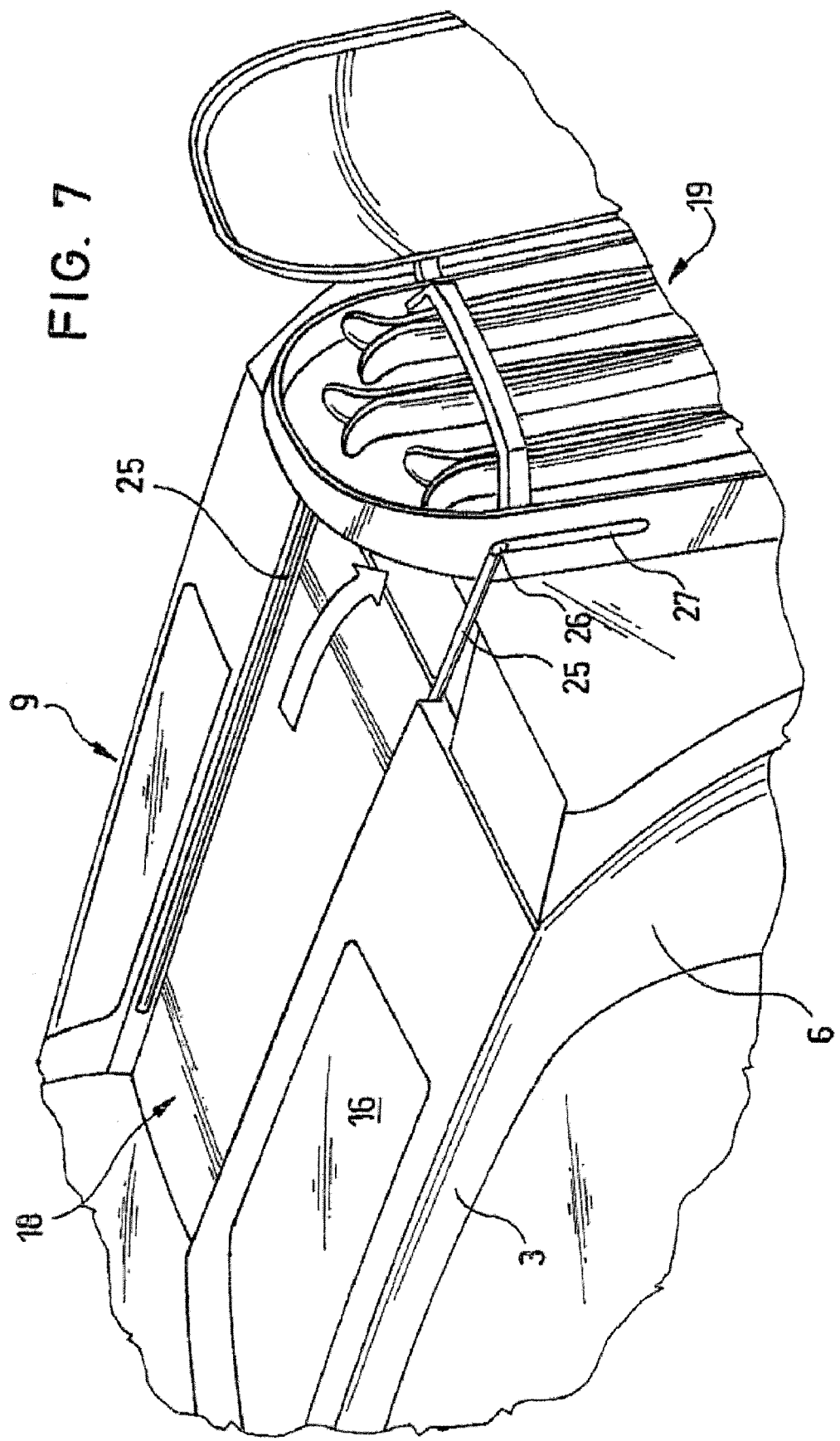

The roof module 9 shown in FIG. 7 comprises a roof box 19 that is to be accommodated displaceably in a manner comparable to that of the exemplary embodiment in FIG. 3. A supporting device for the roof box 19 has a guide rod 25 on each side of the recessed receptacle 18, these guide rods being longitudinally displaceable and telescoping in particular. Each guide rod 25 is mounted on the front side area of the roof box 19 in an articulated joint so that the roof box 19, after being pulled downward from the roof module 9, can be pivoted about a transverse pivot axis formed by both joints 26 (see the position shown in FIG. 7). The two joints 26 may be displaceably accommodated in the respective guides 27 or grooves on the roof box so that in its downwardly pivoted position, the roof box 19 may be lowered further for loading.

The invention claimed is:

1. A roof module securable on a body of a motor vehicle: comprising:
   a roof module that is elevated upward; is at least partially transparent; has a roof box fixedly mounted on its top side; has a supporting device for detachable attachment of a roof box to the top side of the roof module;
   wherein the roof box is fixedly mounted by a slidable mounting comprising at least one guide rod slidably attached and disposed within a matching guide;
   wherein the guide rod has a transverse pivot axis whereby in an extended position, an extended end of the roof box may be lowered further for loading; and wherein the central longitudinal base of the Y structure has a receptacle for the roof box.

2. The roof module of claim 1;
wherein the vehicle further comprises a windshield.

3. The roof module of claim 1;
wherein the roof module further comprises a nontransparent Y structure having free ends that end at the A pillars on the front side of the roof or end at the lateral longitudinal members of the roof, in particular in the area of the A pillars.

4. The roof module of claim 1;
wherein the roof box is arranged centrally on the roof module in the longitudinal extent.

5. The roof module of claim 1;
wherein the roof module further comprises a reinforcing structure.

6. The roof module of claim 5;
wherein the Y structure is formed as a reinforcing structure.

7. The roof module of claim 3;
wherein the Y structure and the reinforcing structure are provided beneath a roof skin of the roof module.

8. The roof module of claim 3;
wherein the Y structure and the reinforcing structure are formed as a frame arrangement and frame openings formed by the frame arrangement are closed by the roof skin and/or the windshield.

9. The roof module of claim 1;
wherein a transverse strut is arranged on an upper edge of the area of the windshield of the roof module on the inside of the roof module and/or the windshield or the roof skin.

* * * * *